United States Patent [19]

Cole

[11] Patent Number: 4,699,345
[45] Date of Patent: Oct. 13, 1987

[54] MOUNTING BRACKET

[76] Inventor: John R. Cole, 1033 Top of the Hill Dr., Akron, Ohio 44313

[21] Appl. No.: 871,784

[22] Filed: Jun. 9, 1986

[51] Int. Cl.⁴ .............................................. E04G 3/00
[52] U.S. Cl. .................................... 248/276; 248/299; 269/111; 403/14; 403/362
[58] Field of Search .................... 248/289.1, 274, 276, 248/299, DIG. 4, 660, 662, 661, 288.1, 667, 674; 409/902; 269/111, 113; 425/38, 19; 403/13, 14, 362

[56] References Cited

U.S. PATENT DOCUMENTS

| 901,284 | 10/1908 | Edmunds | 248/274 X |
| 1,007,590 | 10/1911 | Miller | 248/289.1 |
| 1,189,350 | 7/1916 | Culver et al. | 248/274 |
| 1,614,068 | 1/1927 | Kelsea | 248/274 |
| 3,599,597 | 8/1971 | Maday | 248/274 X |
| 3,825,358 | 7/1974 | Eisenhardt et al. | 403/362 X |

FOREIGN PATENT DOCUMENTS

| 510728 | 1/1955 | Italy | 248/276 |
| 19894 | 3/1905 | Sweden | 403/362 |
| 1515056 | 6/1978 | United Kingdom | 248/289.1 |

Primary Examiner—Robert W. Gibson, Jr.
Assistant Examiner—David L. Talbott
Attorney, Agent, or Firm—Oldham, Oldham & Weber Co.

[57] ABSTRACT

A mounting bracket, especially suitable for supporting a green tire holder, comprises, in series, a fixed bracket secured to a tire mold press, a hollow rectangular housing, and an adjustable arm for supporting a green tire holder on a vertical shaft. The adjustable arm is axially movable, and is also horizontally, vertically, and rotatably adjustable with respect to the hollow housing, so that the shaft can be precisely positioned with respect to the axis of the tire mold. The hollow rectangular housing is secured to the fixed bracket by means of a pivot screw and a removable pin. The housing is fixedly secured to the fixed bracket when the removable pin is in place, and is capable of being swung, so as to permit access to the tire mold, when the pin is removed.

8 Claims, 7 Drawing Figures

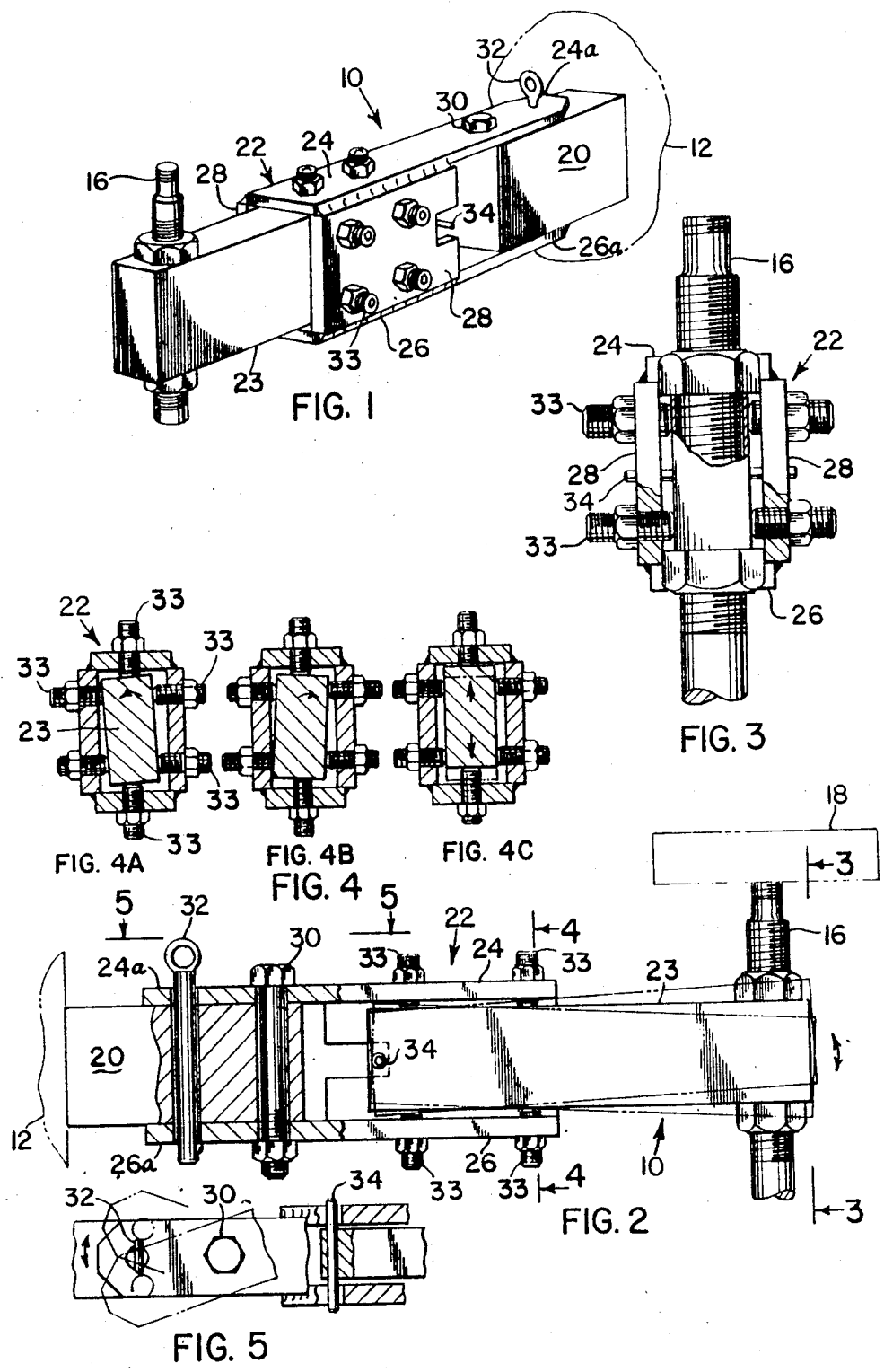

MOUNTING BRACKET

TECHNICAL FIELD

This invention relates to mounting brackets and more particularly to a mounting bracket which is capable of supporting a load in a precisely predetermined position and orientation. In particular, this invention relates to a mounting bracket which is capable of supporting a green tire holder at a precisely predetermined distance from the tire mold, with a shaft supporting the green tire holder precisely parallel to the center axis of the tire mold.

BACKGROUND ART

Pneumatic tires for motor vehicles are built in the green or uncured state and are subsequently cured or vulcanized by application of heat or pressure in a mold. The mold is contained in a press, which permits the application of pressure. The tire both before and after the curing is round, i.e. it is generally toroidal in shape and symmetrical about its axis.

After a green tire has been built, it is transported to the site at which the mold is located. The green tire is placed in the green tire holder where it stays until a mold becomes available. When a mold is available, an automatic loader lifts the tire vertically from the holder, travels horizontally in either a reciprocating or a swinging motion from a position above the green tire holder to a position above the mold, then lowers the green tire vertically into the mold. The path of the automatic loader is precisely predetermined. Whether the horizontal motion is reciprocating or arcuate, distance and direction from the loading position to the unloading position of the automatic loader are precisely determinable.

It is essential to center the tire exactly in the mold; otherwise, the tire will cure unevenly and a poor quality tire will result. To achieve this precise centering without the use of expensive and space-consuming position recognition mechanisms, the path of the automatic loader as it lifts the green tire must coincide precisely with the axis of the green tire holder, and the path of the automatic loader as it lowers the tire into the mold must coincide precisely with the axis of the mold, which is (or at least should be) vertical.

Most mounting brackets support a load in a position which is only approximately that desired. For more purposes, approximate positioning is quite satisfactory. The mounting bracket for supporting a green tire holder, on the other hand, must support the green tire holder so that the axis of the holder is in a precisely predetermined position for the reasons which are apparent from the foregoing description. As far as applicant is aware, no green tire holder mounting bracket presently available is capable of achieving such precise positioning.

DISCLOSURE OF THE INVENTION

It is an object of this invention to provide a mounting bracket which permits the load supported by the bracket to be positioned precisely.

A particular object of this invention is to provide a mounting bracket for supporting a green tire holder in a precisely predetermined position.

A further object of this invention is to provide a mounting bracket, especially for a green tire holder, which can be swung out of its normal position when access to the tire mold is desired.

According to this invention there is provided a mounting bracket for adjustably supporting a shaft having a load thereon, said mounting bracket comprising a hollow housing open at at least one end; means for holding the housing in a fixed position; a longitudinally extending adjustable arm having one end received in the housing, the other end of the arm including means for supporting a shaft having a load therein, the arm being axially movable with respect to the housing, the outside dimensions of the one end of the arm being less than the inside wall dimensions of the housing so that the arm can be adjusted horizontally, vertically and rotatably in the housing; and means associated with the housing for adjustably positioning the one end of the arm and for locking the arm in place once it has been place in the desired position.

In particular, this invention provides a mounting bracket for supporting a green tire holder, in which the green tire holder is the aforementioned load.

BRIEF DESCRIPTION OF DRAWINGS

In the drawings:

FIG. 1 is a perspective view of a mounting bracket according to this invention, mounted on the front of a tire mold press.

FIG. 2 is a side elevation, partly in section, of a mounting bracket according to this invention, with a front side wall of the housing removed.

FIG. 3 is an end view of the mounting bracket, as seen along lines 3—3 of FIG. 2.

FIGS. 4a, 4b and 4c are a series of sectional views, all taken along line 4—4 of FIG. 2, showing how the adjustable arm of the mounting bracket may be rotated about its longitudinal axis.

FIG. 5 is a fragmentary top view, taken along line 5—5 of FIG. 2, showing how the bracket housing may be swung about a pivot screw when access to the tire mold press is desired.

BEST MODE FOR CARRYING OUT INVENTION

This invention will now be described with reference to the preferred embodiment thereof, as illustrated in the accompanying drawings.

Referring now to FIGS. 1 and 2, 10 indicates generally an adjustable mounting bracket according to this invention. As shown in FIG. 1, the mounting bracket is fixedly secured at one end by suitable means, such as welding, to a stationary base member 12, which in the preferred embodiment is a tire mold press. The opposite end of mounting bracket 10 supports a vertical shaft 16, which in turn supports a load 18, such as a green tire holder (shown diagramatically in FIG. 2).

Mounting bracket 10 comprises a fixed bracket member 20 of rectangular cross-section and fixedly secured by welding, for example, to tire mold press 12; a hollow housing 22 of rectangular cross-section, which is secured to fixed bracket 20; and a longitudinally extending adjustable arm 23 having one end received in the hollow housing 22. The other end of arm 23 includes means, such as a cylindrical opening, for supporting shaft 16, which has load 18 mounted thereon. Arm 23 is axially movable with respect to housing 22, i.e. it is movable toward or away from tire mold press 12. Arm 23 also can be adjusted horizontally, i.e. from left to right, vertically as shown in FIGS. 2 and 4C, or rotatably as shown in FIGS. 4A, and 4B, so that shaft 16 may be placed in a precisely predetermined orientation (always absolutely parallel to the axis of the tire mold and usually absolutely vertical) and at a precise distance and direction from the axis of the tire mold. This precise positioning of shaft 16 is possible, even if the fixed bracket member 20 and housing 22 as installed do not point precisely toward the desired axis of shaft 16, or are not precisely horizontal, or are not mounted so that their respective sidewalls are precisely vertical. Since it is very difficult if not impossible to mount fixed bracket 20 and hollow housing 22 as precisely as is required, the adjustability of the arm 23 makes it possible nevertheless to position the shaft 16 and tire holder 18 precisely.

Hollow housing 22 comprises upper wall 24, lower wall 26, and vertical sidewalls 28. Upper and lower walls 24 and 26 have tongues 24a and 26a, respectively, which project beyond the ends of sidewalls 28 toward tire mold press 12, for the purpose of securing housing 22 to fixed bracket member 20. Housing 22 is secured to fixed bracket member 20 by means of a pivot member 30, which may be a screw (as shown) or bolt, and a removable pin 32, both of which pass vertically through fixed bracket 20 and tongues 24a, 26a. Normally, housing 22 is secured in a fixed position with respect to fixed bracket 20. In this case, pin 32 is in place as shown. On occasion it is necessary to have access to the tire mold. For this purpose housing 22 and arm 23 may be swung aside around pivot screw 30, by first removing pin 32.

Arm 23 is of rectangular cross-section, as is also housing 22. However, the dimensions of arm 23, or at least of the end of the arm which is received in housing 22, are smaller than the inside wall dimensions of housing 22, so as to permit horizontal, vertical and rotational movement of arm 23 with respect to housing 22 for the purpose of precisely adjusting the position of arm 23 and the shaft 16 and load mounted thereon. The smaller dimensions of arm 23 are best seen in FIG. 4. Housing 22 has means, shown here as a plurality of adjusting screws 33, for adjustably positioning the one end of arm 23 and for locking arm 23 in place once the arm 23 has been placed in the desired position. Adjusting screws 33 may be arranged in two rows of 6 screws each, each row extending around the perimeter of housing 22. Adjusting screws 33 may be turned manually.

A pin 34, extending horizontally through arm 23 near the end thereof that is held in housing 22, prevents arm 23 from falling out even when all the adjusting screws 33 are loosened, as is apparent from FIG. 1.

The position of arm 23 may be adjusted by turning the adjusting screws 33 as follows:

To move arm 23 axially either toward or away from tire mold press 12, all adjusting screws are loosened slightly, arm 23 is moved, and then the adjusting screws are tightened. If it is necessary to move arm 23 either up or down slightly, as shown in FIG. 2, the upper screw 33 in the front row (row nearest shaft 16) and the lower screw in the back row are turned inwardly, (i.e., tightened) slightly more than normally, and the opposite screws (the lower screw in the front row and the upper screw in the back row), are correspondingly loosened slightly. Similarly, by appropriate adjustment of the side screws 33 in both the front and back rows, arm 23 can be moved either to the right or left of its normal position, in which its axis is aligned with the axes of housing 22 and fixed bracket member 20. To rotate arm 23 slightly, either to the left as shown in FIG. 4A or to the right as shown in FIG. 4B, the side screws in both rows are turned slightly in a manner which is apparent from these figures. That is, to rotate arm 23 to the left (FIG. 4A), the upper left and lower right hand screws in both rows are loosened slightly, and the lower left and upper right hand screws in both rows are tightened. Side screws 33 are turned oppositely to that just described when a slight turning to the right, as shown in FIG. 4B, is required. FIG. 4C illustrates how the screws 33 may be turned to raise or lower the end of arm 23 which is remote from housing 22. To raise the remoted end of arm 23, as shown in FIG. 4C, the lower screw in the front row is turned in more than normal, the upper screw in the front row is turned in less than normal, the reverse is true of the upper and lower screws in the back row, and the side screws are turned to their normal positions.

To position the green tire holder 18 and its supporting shaft 16 in precisely the desired position, the automatic loader (not shown) is moved to the tire loading position and lowered, but with no tire in the holder 18. Then, the green tire holder 18 and shaft 16 are positioned precisely as needed by making the adjustments in the position of arm 23 as above described. All set screws 33 are tightened so as to lock the arm 23 in place, once the desired positioning has been achieved. To confirm the accuracy of the position of green tire holder 18 and shaft 16, the automatic loader may be operated through its normal operating cycle with a green tire in place in holder 18.

The present invention provides a simple, rugged and yet precise device which permits precise positioning of a green tire holder and its supporting shaft, so that the green tire when transferred from the tire holder to the mold, will be precisely centered in the mold. It will be apparent that this same device may be used in other applications where a load must be supported in a precise direction and a precise instance from another object.

While in accordance with the patent statutes, a preferred embodiment and best mode has been presented, the scope of the invention is not limited thereto, but rather is measured by the scope of the attached claims.

What is claimed is:

1. A mounting bracket for adjustably supporting a shaft having a load thereon, said mounting bracket comprising:
  (a) a fixed bracket member adapted to be fixedly secured to a stationary base member;
  (b) an open ended hollow housing mounted on said fixed bracket and adapted to be held in a fixed position;
  (c) a longitudinally extending, adjustable arm having one end received in said housing, the other end of said arm including means for supporting a shaft having a load thereon, said arm being axially movable with respect to said housing, the dimensions of said one end of said arms being less than the inside wall dimension of said housing so that said arm can be adjusted horizontally, vertically and rotatably in said housing; and
  (d) means associated with said housing for adjustably positioning said one end of said arm and for locking said arm in place once it has been placed in the desired position, said means comprising a plurality of adjusting screws extending inwardly from said housing and being adapted to engage said arm at a plurality of spaced points, said screws being arranged in a pair of axially displaced rows, each row having a plurality of screws arranged around the perimeter of said housing, the number of screws being sufficient and so placed as to permit said arm to be moved axially and to be rotated about its axis, and to permit the outer end of the arm to be moved either horizontally or vertically.

2. A mounting bracket according to claim 1 in which said hollow housing is also adapted to be swung horizontally.

3. A mounting bracket according to claim 2 in which said hollow housing is secured to said fixed bracket by means of a vertical pivot member and a removable vertical pin, said pin being removed when swinging movement of said housing is desired.

4. A mounting bracket according to claim 1 in which said shaft is vertical.

5. A mounting bracket according to claim 1 in which said adjustable arm extends horizontally.

6. A mounting bracket according to claim 1 in which said hollow housing and said adjustable arm are of rectangular cross section.

7. A mounting bracket according to claim 6 in which the adjusting screws in each row are adapted to engage each of the four sides of said adjustable arm.

8. A mounting bracket according to claim 7 in which each row of adjusting screws includes a first pair of screws adapted to engage one side of said adjustable arm and a second pair of screws adapted to engage the opposite side of said adjustable arm.

* * * * *